Aug. 26, 1969   M. BIRNBAUM   3,464,023
PULSED LASER ARRANGEMENT
Filed March 8, 1963   4 Sheets-Sheet 1

INVENTOR.
MILTON BIRNBAUM
BY Don Finkelstein
ATTORNEY

Fig. 6

United States Patent Office 3,464,023
Patented Aug. 26, 1969

3,464,023
PULSED LASER ARRANGEMENT
Milton Birnbaum, Palos Verdes Estates, Calif., assignor to The Aerospace Corporation, Los Angeles, Calif., a corporation of California
Filed Mar. 8, 1963, Ser. No. 263,954
The portion of the term of the patent subsequent to Mar. 18, 1986, has been disclaimed
Int. Cl. H01s 3/00
U.S. Cl. 331—94.5      7 Claims This invention relates to the laser art and more particularly to an improved arrangement for providing a pulsed laser beam.

In many applications it is desirable to produce a beam of coherent electromagnetic radiation having energy substantially concentrated in a particular preselected narrow wavelength bandwidth. One type of device capable of generating such a beam of electromagnetic radiation is generally termed a "laser" which is an acronym for "light amplification by the stimulated emission of electromagnetic radiation." In applications utilizing a laser beam, such as communications, medicine, material processing and the like, it is often desirable to provide a laser beam having energy in wavelengths in the near and far ultraviolet, the visible or the near or far infrared portions of electhromagnetic radiation spectrum. However, the laser structure and methods of operation utilized in the past have generally not been able to provide laser beams over this range of electromagnetic radiation wavelengths. More particularly, prior laser beams have generally been limited to wavelengths in the infrared portion of electromagnetic radiation spectrum. Therefore, these prior laser structures and methods of operation have not been able to provide laser beams having energy in wavelengths in the near and far ultraviolet or visible portions of electromagnetic radiation spectrum.

In order to obtain laser outputs in these desired wavelengths it is necessary to provide an improved laser structure and an improved laser operating technique so as to make available for laser operation materials having outputs of electromagnetic radiation in the desired wavelengths.

These desiderata are achieved, according to one embodiment of applicant's invention herein, by selecting as a laser material an optically orientable medium having in its quantum energy structure certain preselected allowable quantum energy levels and certain preselected time constants associated with the energy transitions between the preselected energy levels. The energy separation between at least two of the preselected allowable quantum energy levels is equivalent to the desired laser wavelength of electromagnetic radiation.

In this embodiment the optically orientable medium is contained in an oven that is adapted to emit a beam of the optically orientable particles comprising the optically orientable medium. For example, the oven may contain sodium and emit a beam of sodium atoms, the sodium atoms comprising the optically orientable particles. The beam of optically orientable particles is split by beam splitter techniques into a plurality of discrete secondary beams, and each of the secondary beams is substantially homogeneous in one allowable ground energy level. The beam splitter utilized in this embodiment is a undirectional, non-uniform magnetic field gradient through which the beam of optically orientable particles passes, together with the associated focusing and collimating arrangements. The unidirectional, non-uniform magnetic field provides the "strong field" effect and splits the beam of optically orientable particles into the plurality secondary beams. The physical separation of the secondary beams is proportional to the strength of the magnetic field gradient, the magnetic dipole strength of the optically orientable particles and the distance the secondary beams travel after splitting. Thus, in passing through the magnetic field gradient the beam of optically orientable particles is split into the plurality of secondary beams and each of the secondary beams is substantially homogeneous in a single energy level particle.

A laser cell is positioned to receive selectively one of the secondary beams, that is, only particles having the energy contained in the particular selected secondary beam is admitted into the laser cell. In this embodiment the laser cell comprises a cylindrical body member defining a cavity and the walls of the body member are transparent to preselected wavelengths of electromagnetic radiation. A pair of flat, parallel, oppositely-disposed end wall portions close the ends of the cavity and have surfaces that provide for internal reflection of the desired laser emission wavelength across the cavity. One of the end wall portions is partially transparent to this desired laser wavelength. A tube-like member defines a passageway into the cavity and is coupled to the walls of the body portion. The preselected secondary beam enters the passageway and the particles therein are allowed to fill the cavity to a preselected pressure level.

The particular particle selected for utilization in this embodiment has in its quantum energy structure energy separations corresponding to the desired laser emission wavelength bandwidth.

The secondary beam enters the cavity at a preselected flow rate of particles. Simultaneously there will be a diffusion of some of the particles out of the cavity. The particles leaving the cavity also leave through the above-described passageway. Thus, virtually all the particles in the cavity are in a single energy level, the only variation from this single energy level being that caused by collisions, spontaneous decays or other forms of disalignment within the cavity.

While the particles are in the cavity of the laser cell they are subjected to an intense trigger light beam. The trigger light beam has energy in wavelength corresponding to a preselected energy separation between allowable quantum energy levels of the particles. The action of the trigger light beam upon the particles induces a sudden energy transition of the particles from the preselected energy level of the selected secondary beam up to a higher energy level. Virtually all the particles in the cavity undergo this transformation and this provides an overpopulation condition at the higher energy level with respect to some lower energy level. The trigger light beam is cyclically terminated. The particles undergo a spontaneous decay down to the lower energy level and the energy separation between the higher energy level and the lower energy level corresponds to the desired laser emission wavelengths.

As the particles undergo this transition they emit electromagnetic radiation having a wavelength in the desired laser wavelength. Some of this radiation is emitted in a direction perpendicular to the two end portions of the laser cell and is reflected back and forth across the cavity thereby. This induces the stimulated emission of electromagnetic radiation at the desired laser wavelength from an additional number of particles and a part of this electromagnetic radiation is transmitted through the partially transparent end portion and comprises the coherent beam of electromagnetic radiation for the laser emission.

Laser action ceases when a sufficient number of atoms accumulate in the lower energy level to make the population inversion necessary for laser action impossible. The particles in the cavity are now substantially disaligned from the energy level in the preselected secondary beam. However, the secondary beam is continually filling the cavity with properly aligned particles and the disaligned particles gradually diffuse out through the passageway until the cavity is once again substantially filled with particles in the preselected energy level of the selected secondary beam. When this occurs the trigger light may again be cyclically ignited to provide the laser action.

In other embodiments of applicant's invention optical pumping may be utilized as an adjunct in the mechanism for achieving a beam of particles having energy substantially homogeneous in a preselected energy level.

These and other embodiments are more fully described in the following detailed specification taken together with the accompanying drawings wherein similar reference characters refer to similar elements and in which.

Before detailing a description of applicant's improved laser and the structure associated with his invention herein applicant first presents a brief discussion of the fundamental physical concepts underlying applicant's invention in order that the operation of applicant's improved laser may be better understood.

Figure 1A:
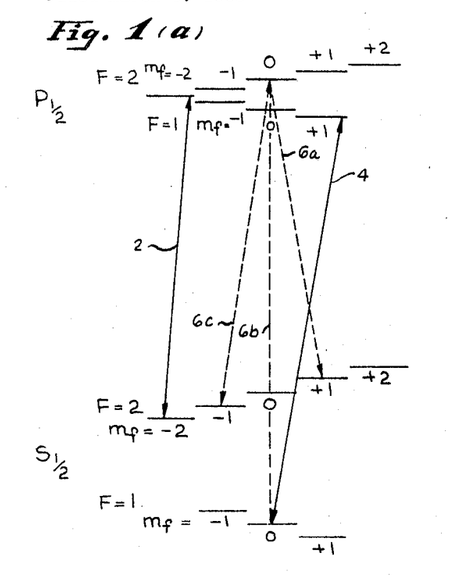
FIGURES 1a, 1b and 1c are diagrammatic representations of some of the various quantum energy levels associated with an optically orientable medium that may be utilized in applicant's invention herein.

Applicant utilizes as his medium from which the laser beam is emitted a collection of optically orientable particles having certain physical characteristics. One medium that applicant has found to possess these characteristics is sodium. Referring to FIGURE 1a, there is shown a diagrammatic representation of a portion of the allowable quantum energy levels of sodium. Since sodium has a quantum nuclear spin magnetic moment of 3/2 and an orbital electron magnetic moment of 1/2, both the ground state $S_{1/2}$ and the first optically excited state $P_{1/2}$ each have two energy levels equivalent to F=1 and F=2. In a weak magnetic field these two energy levels at each energy state become, by Zeeman splitting, the magnetic substates ($m_f$) shown. These magnetic substates for the F=1 levels are $m_f = -1$, 0 and +1. For the F=2 levels the magnetic substates are $m_f = -2, -1, 0, +1$ and +2. Thus, there are three magnetic substate energy levels in each F=1 level and five magnetic substates energy levels in each F=2 level.

It is to be understood that the utilization of sodium atoms as an illustrative optically orientable particle is not to be construed as limiting applicant's invention to sodium; rather, as discussed below, there are many other optically orientable particles that may be utilized in applicant's invention.

The energy separation between the F=1 and F=2 levels at the $P_{1/2}$ first optically excited state is quite small and in fact is optically unresolvable. However, the energy separation between the F=1 and F=2 levels of the $S_{1/2}$ ground state is appreciable and thus transitions between either the F=1 or the F=2 level of the $S_{1/2}$ ground state and the $P_{1/2}$ first optically excited state basically comprises two wavelengths: one wavelength corresponding to the energy transitions between magnetic substates of the F=2 level of the $S_{1/2}$ ground state and either the F=2 or F=1 levels of the $P_{1/2}$ first optically excited state, and a second wavelength corresponding to the energy transitions between the magnetic substates of the F=1 or F=2 levels of the $P_{1/2}$ first optically excited state. These transitions are indicated schematically on FIGURE 1a by the lines 2 and 4.

The energy separation between magnetic substates at the same energy level are also optically unresolvable and thus transitions between magnetic substates at the same energy level and magnetic substates of another energy level may be considered to be equivalent to either the wavelength corresponding to the energy separation illustrated by the line 2 or the wavelength corresponding to the energy separation illustrated by the line 4.

If a collection of optically orientable particles, such as a collection of sodium atoms, at the $S_{1/2}$ ground energy state is subjected to optical pumping electromagnetic radiation having energy in wave lengths corresponding to the energy separations indicated by the lines 2 and 4 on FIGURE 1, energy is transferred from the optical pumping electromagnetic radiation to the optically orientable particles and the sodium atoms will be "pumped." This process is generally termed "optical pumping." If polarized or is plane polarized then transitions may be made between magnetic substates of any value in the $S_{1/2}$ ground state and the $P_{1/2}$ first optically excited state. If, however, the optical pumping electromagnetic radiation is circularly polarized, then the selection rules apply and in the transitions the atoms can only undergo a change of one magnetic substate number. The type of transition as induced by circularly polarized optical pumping electromagnetic radiation is illustrated by the line 4 on FIGURE 1a and the type of transition induced by plane polarized or unpolarized optical pumping electromagnetic radiation is illustrated on FIGURE 1a by the line 2.

It will be appreciated that with continued optical pumping with right hand circularly polarized electromagnetic radiation having wavelengths equivalent to the separations indicated by lines 2 and 4 on FIGURE 1a, the optically orientable particles will be pumped into the $m_f = +2$ magnetic substate at the F=2 level of the $S_{1/2}$ ground state. In transitions from the magnetic substate levels of the $P_{1/2}$ first optically excited state the particles undergo spontaneous decay transitions back down to the $S_{1/2}$ ground energy state. In these spontaneous decay transitions the atoms may undergo a change in magnetic substate number by gaining or losing one, or the magnetic substate number may stay the same. Such transitions are indicated by the dotted lines 6a, b and c, all of which show transitions from the $m_f = 0$, F=2 level of the $P_{1/2}$ first optically excited state.

For an equal distribution of atoms in the magnetic substate levels of the $P_{1/2}$ optically excited state there are various probabilities for returning down to any particular magnetic substate of the $S_{1/2}$ ground energy state and these probabilities determine the relative strength of the electromagnetic radiation emitted from the atoms during these decay transitions. This electromagnetic radiation emitted will have energy in wavelengths equivalent to that shown by the lines 2 and 4 with relative intensities depending upon the above-described probabilities.

As a general rule, however, it can be seen that since there are only three magnetic substates in the F=1 level of the $S_{1/2}$ ground state and five magnetic substates in the F=2 level of the $S_{1/2}$ ground state, then the electromagnetic radiation emitted during the decay transitions having energy in a wavelength equivallent to that illustrated by the line 2 will be stronger with a higher intensity than the electromagnetic radiation emitted having energy in a wavelength equivalent to that illustrated by the line 4.

When a beam of optically orientable particles such as sodium atoms are subjected to a strong, non-uniform magnetic field gradient there is a decoupling of the nuclear magnetic moment from the orbital electron magnetic moment and splitting of the atoms takes place that is slightly different from Zeeman splitting. This splitting is illustrated graphically in FIGURE 1b which shows the energy separations of a sodium atom at the $S_{1/2}$ ground state when subjected to zero magnetic field, a weak magnetic field.

Figure 1B:
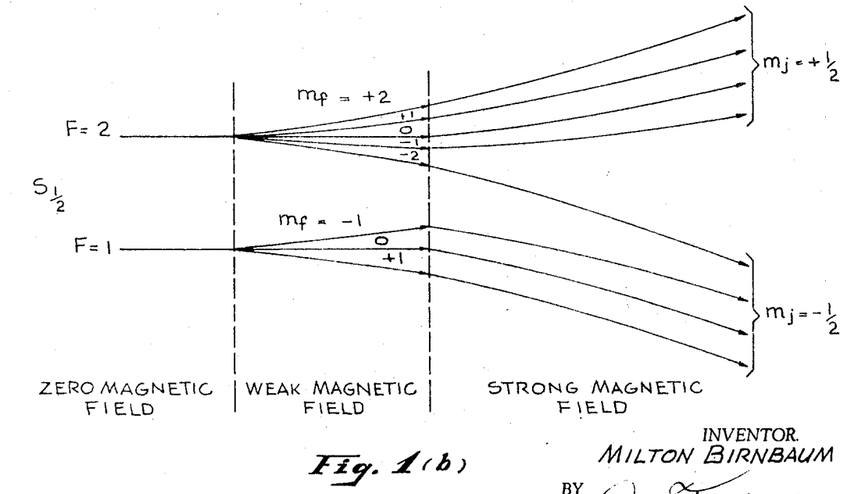

In the zero magnetic field region the atoms are either in the F=2 or F=1 energy levels. In the weak magnetic field region, as illustrated in detail on FIGURE 1a and described above, Zeeman splitting occurs and the atoms are split into the plurality of magnetic substates. However, in a strong, non-uniform magnetic field gradient the Paschen-Back effect occurs and the particles are split into two main beams: one beam with the electron magnetic moment, $m_j$ equal to $+\frac{1}{2}$ and comprising the $m_f=+2, +1, 0$ and $-1$ magnetic substates of the F=2 level, and a second beam with the electron magnetic moment, $m_j$, equal to $-\frac{1}{2}$ and comprising the $m_f=2$ magnetic substate of the F=2 level and the $m_f=-1, 0$ and $+1$ magnetic substates of the F=1 level. There is a comparatively large physical separation between the two main beams, and a comparatively small separation between the individual magnetic substate beams in each main beam. Thus, all the particles in the $m_j=+\frac{1}{2}$ beam are in the F=2 level and ¾ of the particles in the $m_j=-\frac{1}{2}$ beam are in the F=1 level and when removed from the strong magnetic field gradient will revert thereto.

Figure 1C:
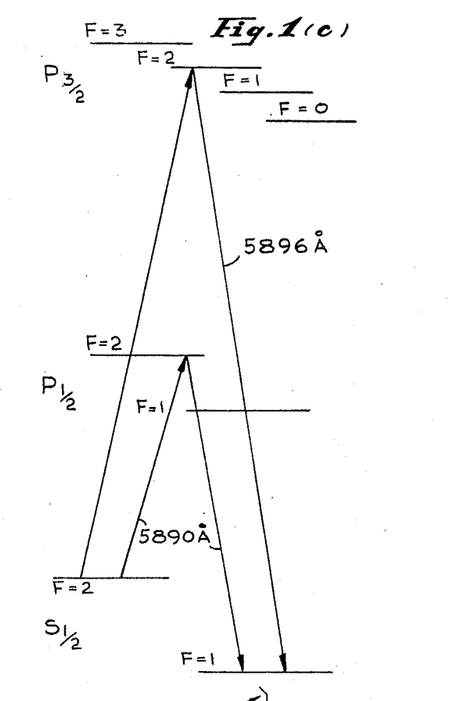

In the absence of a magnetic field there is no splitting into the magnetic substates and the particles may be identified by reference to their energy levels. FIGURE 1c illustrates some of the allowable energy levels of a sodium atom in a zero magnetic field environment. If a beam or a collection of sodium atoms is in the F=2 level of the $S_{1/2}$ ground state, which may be provided by the optical pumping methods or beam splitting techniques described above, quantum energy transitions may be induced therein by optical excitation to provide a preselected electromagnetic radiation output therefrom. As shown on FIGURE 1c the particles may be in the F=2 level with no particles, or very few, in the F=1 level of the $S_{1/2}$ ground state. If an intense beam of unpolarized or plane polarized electromagnetic radiation having a wavelength of 5890 A., the separation between the $S_{1/2}$ and $P_{1/2}$ states, irradiates the particles in the F=2 level of the $S_{1/2}$ state, a large percentage of the particles will be pumped up to the $P_{1/2}$ state.

When a sufficient number of atoms have been pumped from the $S_{1/2}$ ground state up to the $P_{1/2}$ first optically excited state such that there is an over-population of the $P_{1/2}$ first optically excited state with respect to the F=1 energy level of the $S_{1/2}$ ground state, a population inversion therebetween will occur and, in the proper environment, as described below, the atoms in the $P_{1/2}$ first optically excited state can be induced to make stimulated energy transitions from the $P_{1/2}$ first optically excited state down to the F=1 energy level of $S_{1/2}$ ground state.

The degree of overpopulation required to allow this stimulated emission to occur is dependent upon the particular optically orientable particle utilized. When this stimulated emission occurs, electromagnetic radiation having energy in wavelengths equivalent to 5890 A. will be emitted. This is the laser emission from the optically orientable particles and, in the proper environment, a coherent beam of electromagnetic radiation having energy in this wavelength will be emitted from the optically orientable particles.

In inducing the overpopulation condition at the $P_{1/2}$ first optically excited state, it is necessary that the lifetime of the particles comprising the optically orientable medium at the $P_{1/2}$ first optically excited state be on the same order of magnitude as the optical pumping that achieves the overpopulation condition. Therefore, preferably a very intense beam of unpolarized or plane polarized electromagnetic radiation is utilized to achieve the overpopulation condition so that a rapid transition of the particles from their aligned condition in an energy level of a particular magnetic substate of the $S_{1/2}$ ground state up to the $P_{1/2}$ first optically excited state occurs, and during this establishment of an overpopulation condition, there is very little spontaneous decay. By achieving this high degree of overpopulation of the $P_{1/2}$ first optically excited state with respect to the substantially empty F=1 energy level of the $S_{1/2}$ ground state, laser operation may be initiated.

Similarly, if intense plane polarized or unpolarized electromagnetic radiation having a wavelength of 5896 A. is utilized to irradiate the particles in the F=2 level of the $S_{1/2}$ ground state, either in addition to or in place of the 5890 A. radiation, a percentage of the particles will be pumped up to the $P_{3/2}$ second optically excited state and an overpopulation thereof with respect to the substantially empty F=1 level of the $S_{1/2}$ state will be induced. Drop down transitions therebetween may then be induced to provide an emission of electromagnetic radiation having a wavelength of 5896 A.

Optically orientable mediums that may be utilized in applicant's invention herein are thus defined as those mediums capable of transformation into a beam of optically orientable particles having allowable energy levels and preselected energy separations therebetween. Also, transitions between these energy levels may be optically induced by methods similar to that described above in connection with the energy level diagram for sodium shown. Additionally, the optically orientable particles must have time constants associated with their transitions and lifetimes at a given allowable energy level as above specified.

In addition to the sodium atoms described above and utilized for illustrative purposes, applicant has found that many other materials, atoms as well as molecules, may be utilized to provide the optically orientable particles in applicant's invention for providing improved laser operation. Table I below is a listing of some of the materials that may be utlized as optically orientable particles in applicant's invention herein.

TABLE I.—OPTICALLY ORIENTABLE PARTICLES

| Element: | Laser emission wavelengths (Angstroms) |
|---|---|
| Hydrogen | 1215.7 |
| Lithium | 6707 |
| Sodium | 5889 |
| Potassium | 7664 |
| Rubidium | 7800 |
| Cesium | 8521 |
| Magnesium | 4571 |
| Calcium | 6573 |
| Cadmium | 3261 |
| Mercury | 2537 |

The laser emission wavelengths specified in Table I are only the principal lines of the emission from each of the elements specified. As discussed above, there often may be several wavelengths associated with the coherent beam of electromagnetic radiation obtained from the spontaneous emission of electromagnetic radiation in applicant's laser.

When utilizing materials other than the sodium described above, the same techniques as described may be utilized in the practice of applicant's invention. However, there will be slight variations apparent to those skilled in the art because of the different hyperfine structures in the magnetic substrates and different time constants of other optically orientable particles.

The above physical principles are utilized in applicant's invention herein to provide a laser operation in which a pulsed coherent beam of electromagnetic radiation containing energy in preselected wavelengths is emitted. The preselected wavelengths correspond to allowable energy transitions for the particular optically orientable particles selected. As shown on Table I, applicant's invention herein allows laser emissions with wavelengths from the far ultraviolet of hydrogen at 1215.7 Angstroms through the near ultraviolet, visible and into the infrared portions of electromagnetic spectrum with cesium at 8521 Angstroms. However, Table I is not intended to be a complete listing of all materials that may be utilized in applicant's invention herein. Rather, it is an example of the wide range of wavelengths obtainable in a laser emission by the utilization of applicant's improved laser structure and method of operation thereof.

Figures 2, 3, 3A, 4, 5:
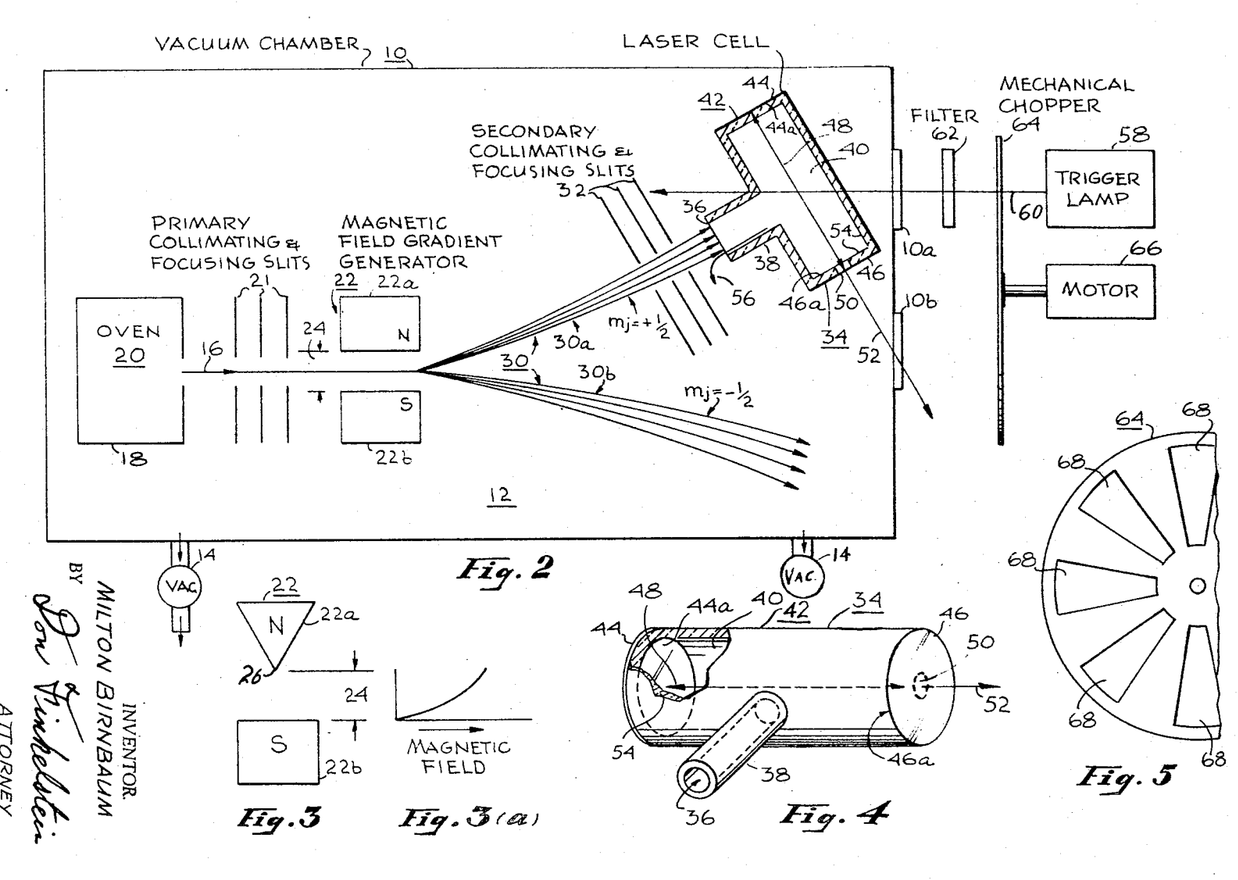
FIGURE 2 is a schematic representation of one embodiment of applicant's invention.
FIGURE 3 is a schematic representation of a unidirectional non-uniform magnetic field gradient generator useful in the practice of applicant's invention.
FIGURE 4 illustrates a laser cell useful in applicant's invention.
FIGURE 5 illustrates a mechanical chopper that may be utilized in the embodiments of applicant's invention herein.

Referring now to FIGURE 2, there is shown in schematic representation the structure associated with one embodiment of applicant's invention. As shown on FIGURE 2 there is a vacuum chamber 10 having an internal volume 12 in which a preselected low pressure is maintained by a pair of vacuum pumps 14. A beam of optically orientable particles 16 is generated in the interior 12 of the vacuum chamber 10 from a source of optically orientable particles such as the oven 18. The oven 18 may be of any well-known design, such as an induction heated oven or any other source for generating the beam of optically orientable particles 16. Maintained within the oven 18 is a supply of optically orientable medium 20 which, for example, may be sodium. When the oven 18 is energized the sodium 20 is evaporated therein and, because of the low pressure maintained within the vacuum chamber 10, a beam of optically orientable particles 16 is emitted therefrom and, in this embodiment, the beam of optically orientable particles comprises a beam of sodium atoms in their ground energy state.

The beam of optically orientable particles pass through a series of primary collimating and focusing slits 21 which provide a substantially linear beam at the exit therefrom. This linear beam of optically orientable particles is directed through a unidirectional, non-uniform, strong magnetic field gradient generator 22 which, for example, may comprise a north pole 22a and a south pole 22b of a permanent magnet. Any other type of magnetic field gradient generator may also be utilized in applicant's invention, such as an electromagnet. The magnetic field gradient generator 22 provides a unidirectional, non-uniform, strong magnetic field between the pole pieces 22a and 22b through which the linear beam of optically orientable particles 16 passes.

FIGURE 3 illustrates one form of the pole pieces 22a and 22b that may be utilized to provide the unidirectional non-uniform magnetic field gradient. As shown on FIGURE 3, the pole piece 22a is substantially wedge-shaped and the pole piece 22b is substantially rectangular. The magnetic field gradient induced by the opposite polarity pole pieces 22a and 22b across the gap 24 therebetween is illustrated in the corresponding graph of FIGURE 3a. As shown thereon, the magnetic field strength is greatest in a plane corresponding to the point 26 of the wedge-shaped pole piece 22a and decreases in strength down to the upper surface of pole piece 22b.

This unidirectional, non-uniform, strong magnetic field gradient in the gap 24 between the pole pieces 22a and 22b of magnetic field gradient generator 22 exerts a differential force upon the optically orientable particles in the beam of optically orientable particles 16 depending upon their magnetic dipole strength. For example, with the optically orientable particle beam 16 comprising a beam of sodium atoms in the $S_{1/2}$ ground state, each of the magnetic substates of the F=1 and the F=2 level will be acted upon by a different force in passing between the pole pieces 22a and 22b. Further, the unidirectional, non-uniform, strong magnetic field also induces splitting of the beam of optically orientable particles 16 into two main secondary beams 30, each comprising beams of particles in certain magnetic substates, as described above. Since each of the magnetic substates has a different dipole strength, as shown on FIGURE 1b, the force exerted by the magnetic field generator 22 on particles in each of the individual magnetic substates will be different and consequently there is a comparatively large separation between main secondary beams 30a and 30b corresponding to $m_j=+\frac{1}{2}$ and $m_j=-\frac{1}{2}$, respectively.

The secondary beam 30a is substantially homogeneous in a single energy level particle at the F=2 level of the $S_{1/2}$ ground state. The other secondary beam, 30b, comprises approximately 75% of particles having energy in the F=1 level and 25% in the F=2 level, as described above. For descriptive purposes applicant will describe the operation of the embodiment of his invention shown on FIGURE 2 as utilizing the secondary beam 30a from which pulsed laser emission is emitted. It will be appreciated that the other secondary beam 30b could equally well be utilized to provide laser emission, in accordance with the principles of applicant's invention herein, since it is predominately comprised of F=1 level particles.

The secondary beam 30a passes through secondary collimating and focusing slits 32 which provide a substantially linear unidirectional secondary beam of optically orientable particles eliminating dispersions that might occur in the secondary beam 30a. However, the secondary collimating and focusing slits 32 may be omitted when the secondary beam 30a is of a sufficiently narrow and unidirectional character such that further collimating and focusing is not required.

The actual physical separation of the secondary collimating and focusing slits 32 from the magnetic field gradient generator 22 is selected from considerations of the particular type of optically orientable medium 20, that has been selected, in order that a proper separation between the secondary beam 30a and 30b may be obtained. Thus, only the particular selected secondary beam such as the secondary beam 30a passes through the secondary collimating and focusing slits 32.

It will be appreciated that after leaving the magnetic field gradient generator 22 the secondary beams 30 are in a zero magnetic field environment and each of the magnetic substate beams in each secondary beam 30 travels in a substantially straight line since there are no forces acting on the secondary beams 30 to induce curvature in their trajectory path. However, while passing through the gap 24 between the pole pieces 22a and 22b of magnetic field gradient generator 22, the paths will be curved because of the varying forces acting upon the particles comprising the beam of optically orientable particles 16. Thus, separation actually begins as soon as the beam of optically orientable particles 16 enters the gap 24 and the pole pieces 22a and 22b are made sufficiently long so that a desired physical separation and velocity direction vector of the individual secondary beams 30 is obtained when they leave the magnetic field gradient generator 22.

In some applications it may be desirable to provide that more than only the secondary beam 30a pass through the secondary collimating and focusing slits 32 for utilization in generating a pulsed laser beam according to applicant's invention. For descriptive purposes, in this embodiment illustrated on FIGURE 2, the particles in the secondary beam 30a are utilized. This is not to be construed as a limitation on applicant's invention herein, however.

After passing through the secondary collimating and focusing slits 32 the secondary beam 30a enters a laser cell 34 through a passageway 36 in a tube-like member 38 and fills the laser cavity 40 to a preselected pressure as determined from the pressure maintained within the interior 12 of chamber 10.

FIGURE 4 illustrates a preferred form of laser cell 34 that may be utilized in the embodiments of applicant's invention herein. As shown on FIGURE 4 the laser cell 34 comprises a tubular body member 42 transparent to preselected wavelengths of electromagnetic radiation. Thus, for example, the body member 42 may be fabricated from a tube of quartz or similar such material. A pair of end plates 44 and 46 are coupled to the body member 42 to form the laser cavity 40. The end plates 44 and 46 are substantially flat and parallel and spaced a preselected distance apart, the distance being selected from a consideration of the desired wavelength of electromagnetic radiation that is to be contained in the laser beam. End plates 44 and 46 have surfaces that are reflective of electromagnetic radiation, at least to that electromagnetic radiation having a wavelength equivalent to the desired laser emission wavelength. The reflective surfaces which, for example, may be the internal surfaces 44a and 46a of end plates 44 and 46, respectively, coated with a coating of gold, silver, aluminum, or a multiple layer dielectric coating to reflect electromagnetic radiation back and forth across the laser cavity 40, as illustrated by the arrow 48.

One of the end plates, for example, end plate 46, is slightly transparent to the preselected wavelength of electromagnetic radiation desired in the laser beam, and this slight transparency may be provided by either a small area 50 that is not coated with reflecting material and that is transparent to the preselected wavelength of electromagnetic radiation, or a slight area may be left only partially reflecting of the preselected wavelength and partially transmitting of the preselected wavelength of electromagnetic radiation. This area 50 allows electromagnetic radiation to leave the laser cavity 40 as illustrated by the arrow 52. As more fully described below, electromagnetic radiation 52 comprises the laser emission.

A tube-like member 38 is coupled to the body member 42 and defines a passageway 36 that provides access and communicates with the laser cavity 40 through the walls of body member 42. The tube-like member 38 may be omitted, if desired, and only an aperture provided for access to the cavity 40.

It will be appreciated that many variations of the laser cell 34 may be utilized in applicant's invention. For example, the end plates 44 and 46 may be fabricated of quartz and left unreflective, that is transparent to wavelengths of electromagnetic radiation, and the reflecting surfaces may be placed external to the laser cell 34 and parallel to the end plates 44 and 46 to provide the reflection back and forth across the laser cavity 40. Similarly, the tube-like member 38 may also be fabricated of quartz to facilitate bonding to the body member 42. However, other materials may also be utilized for the tube-like member 38.

Referring back now to FIGURE 2, the selected secondary beam 30a enters the laser cavity 40 through the passageway 36 and fills the laser cavity 40 with optically orientable particles all substantially in the same energy level of F=+2. There may be some particles not in the FF=+2 level originally in the secondary beam 30a and such disalignment may be caused by collisions with the walls of the body member 42 and end plates 44 and 46, thermal disalignment, or the like. To minimize the variation from the preselected magnetic substate in the selected secondary beam 30a applicant has found it advantageous to coat the internal wall surfaces of the body member 42 with certain surface coatings 54 that minimize the disalignment due to collision of the optically orientable particles with the wall portions of the body member 42.

Such a coating may comprise DRI–FILM manufactured by General Electric Company, eicosane, or paraffin. However, it is necessary that at least a portion thereof be transparent to preselected wavelengths of electromagnetic radiation. Utilization of wall coatings 54 has been found to improve the operation of the applicant's laser. However, satisfactory operation may be obtained without utilizing any wall coatings in the laser cell 34.

The secondary beam 30a may be continually directed into the laser cavity 40 and after the pressure in the laser cavity 40 achieves a preselected value as described above, the particles from the cavity 40 will begin to diffuse out through the passageway 36, as illustrated by the arrow 56. This stabilizes the pressure in the laser cavity 40 at the preselected value.

The particles contained within the secondary beam 30b, as well as the particles diffusing out through the passageway 36 from the cavity 40, as illustrated by the arrow 56, will be removed from the interior 12 of the chamber 10 through the vacuum pumps 14. As pointed out above, this is a continuous process and hence optically orientable particles are continually being removed from the interior 12 of the chamber 10.

A trigger lamp 58 is positioned external the chamber 10 and is adapted to emit an intense beam of trigger light electromagnetic radiation 60 having energy in a preselected wavelength of electromagnetic radiation. As illustrated on FIGURE 2, when the selected secondary beam 30a comprises optically orientable sodium atoms in the F=2 level of the $S_{1/2}$ ground state, the trigger light electromagnetic radiation 60 must contain energy in, for example, the wavelength 5890 A. corresponding to the energy separation between the $S_{1/2}$ ground state and the $P_{1/2}$ first optically excited state and/or the wavelength 5896 A. corresponding to the energy separation between the $S_{1/2}$ ground state and the $P_{3/2}$ second optically excited state. Further, applicant has found that the trigger light electromagnetic radiation 60 is preferably intense so that a sudden transition of substanially all the particles contained within the laser cavity 40 between the F=2 level of the $S_{1/2}$ ground state up to the $P_{1/2}$ or $P_{3/2}$ first optically excited state takes place in a comparatively short time, depending upon the particular particles and geometry selected for utilization in the laser, as more fully discussed below.

A filter 62 may be positioned between the trigger lamp and the laser cell 34 to remove the wavelengths of electromagnetic radiation other than the preselected wavelengths of electromagnetic radiation described above.

It will be appreciated that when materials other than sodium are utilized as the optically orientable medium 20 in the oven 18, the particular designations of the energy levels and the transitions therebetween will be different for each material selected. However, those skilled in the art may easily determoine the particular preselected wavelengths of electromagnetic radiation required in the trigger beam 60 for any given optically orientable particle. When sodium is utilized as the optically orientable medium 20, applicant has found that the trigger lamp 58 may comprise an intense sodium vapor lamp emitting the intense beam of trigger light electromagnetic radiation 60.

As the trigger light electromagnetic radiation 60 irradiates the optically orientable particles contained within the laser cavity 40, energy is transferred from the trigger light 60 to the optically orientable particles contained within the laser cavity 40 and induces the particles to undergo a transition up to, for example, the $P_{1/2}$ first optically excited state. After being pumped up to the $P_{1/2}$ first optically excited state, the particles are in a population inversion condition with respect to the empty F=1 level of the $S_{1/2}$ ground state and undergo a spontaneous decay back down to the F=1 energy level of the $S_{1/2}$ ground state. Tthese transitions are indicated on FIGURE 1c.

As the particles undergo the transition from the $P_{1/2}$ first optically excited state, down to the magnetic substates of the F=1 level of the $S_{1/2}$ ground state, electromagnetic radiation having a wavelength equivalent to 5890 A. is emitted therefrom. Part of this electromagnetic radiation will be emitted in a direction parallel to the arrow 48 across the laser cavity 40 and perpendicular to the end plates 44 and 46 thereof. Such radiation will be reflected back and forth across the laser cavity 40 by the reflective surface portions 44a and 46a of the end plates 44 and 46, respectively, and will stimulate further emission of electromagnetic radiation from the optically orientable particles by inducing further energy drop down transitions from the $P_{1/2}$ first optically excited state to the $F=1$ level of the $S_{1/2}$ ground state. This process builds up as a cascade-type emission and electromagnetic radiation in a coherent beam and containing energy in the wavelength 5890 A. is emitted from the laser cavity 40 through the partially transparent area 50, as illustrated by the arrow 52, and comprises the coherent beam of electromagnetic radiation of the laser emission. Similarly, radiation having a wavelength of 5896 A. will be emitted if the trigger light beam 60 contains energy of this wavelength.

In the embodiment illustrated schematically on FIGURE 2, the wall portions of the chamber 10 must be transparent to selected wavelengths of electromagnetic radiation to allow the trigger light beam 60 and the laser beam 52 to pass therethrough, as shown by sections 10a and 10b.

After the optically orientable particles have dropped down to the $F=1$ level of the $S_{1/2}$ ground energy state to a sufficient degree that the population inversion required for the stimulated emission of electromagnetic radiation no longer exists, laser action will cease and the beam of electromagnetic radiation 52 will terminate. The optically orientable particles in the laser cavity 40 are then disoriented from the preselected energy level $F=2$ that is originally contained in the selected secondary beam 30a. However, as the secondary beam 30a continually fills the laser cavity 40, as described above, the disoriented particles will gradually diffuse out through the passageway 36 as illustrated by the arrow 56 and be removed by the vacuum pumps 14. Therefore, within a certain time period the cavity 40 will again be filled with particles in the $F=2$ level and be ready for a repetitious action of the laser emission.

The trigger light electromagnetic radiation 60 must be cyclically terminated in order to allow the diffusion of the disoriented particles out of the cavity 40 and the filling of the laser cavity 40 with the oriented particles contained in the selected secondary beam 30a. To achieve this cyclical operation of the trigger light electromagnetic radiation 60, applicant provides, in the embodiment illustrated on FIGURE 2, a mechanical chopper 64 driven by a motor 66. Other forms of cyclically interrupting the trigger light beam 60 are described below. The mechanical chopper 64 is only one of many methods that may be used to cyclically terminate the trigger light electromagnetic radiation 60 irradiation of the particles contained within the laser cavity 40.

The mechanical chopper 64 is illustrated on FIGURE 5. As shown on FIGURE 5, the mechanical chopper 64 comprises a disc opaque to electromagnetic radiation in which a plurality of radial openings 68 have been cut. In utilizing this type of mechanical chopper 64 the trigger lamp 58 may be left on continuously and the motor 66 may rotate the mechanical chopper 64 at a preselected speed to provide cyclical irradiation by the trigger light electromagnetic radiation 60 of the optically orientable particles contained within the laser cavity 40. As the chopper disc 64 rotates the trigger light electromagnetic radiation 60 will cyclically be transmitted through the radial openings 68 to irradiate the optically orientable particles contained within the laser cavity 40 and will cyclically stop this irradiation as the opaque portions of the mechanical chopper 64 are cyclically in the path of the trigger light electromagnetic radiation 60. The size of the slots 68 and the relative time periods between periods of irradiation of the particles contained within the laser cavity 40 and the periods when they are not so irradiated may be selected from considerations of the rate at which the secondary beam 30a fills the laser cavity 40 and the particular time constants associated with the particular optically orientable medium 20.

Since it is desired, in laser operations, to obtain an intense laser emission of electromagnetic radiation, from the above description of the embodiment of applicant's invention illustrated on FIGURE 2 it can be seen that it is desired that all the particles contained within the laser cavity 40 be at the same preselected energy level. For the particular embodiment shown on FIGURE 2 wherein sodium was utilized as the optically orientable medium 20 and the $F=2$ level of the $S_{1/2}$ ground state was selected as the energy level in the secondary beam 30a, it is advantageous that all the particles contained within the laser cavity 40 be in the $F=2$ level. This provides the high degree of population inversion required with respect to the $F=1$ level after the energy transitions induced by the trigger light electromagnetic radiations 60 take place. That is, there are few, if any, particles remaining in the $F=1$ level of the $S_{1/2}$ ground state.

It will be appreciated, however, that the preselected secondary beam 30a contains several beams of particles in various magnetic substates, since they had been separated by the magnetic field gradient. These are directed into the laser cavity 40 and these beams contain energy in magnetic substates $m_f=+2$, $+1$, 0 and $-1$ of the $F=2$ level of the $S_{1/2}$ ground state.

Similarly, optically orientable particles in the magnetic substrates of the $F=1$ level of the $S_1/_2$ ground state as in secondary beam 30b may be introduced into the laser cavity 40, since the trigger light electromagnetic radiation 60 contains energy necessary to pump out of the $F=1$ level of the $S_1/_2$ ground state up to the $P_1/_2$ or $P_3/_2$ optically excited states.

However, as described above, in the preferred embodiments of applicant's invention it is desired to utilize in the laser cavity 40 optically orientable particles in a single magnetic substate, since an overpopulation condition can thus be vertically assured. Applicant has found that as the selected secondary beam 30a passes through the passageway 36 and into the laser cavity 40, collisions occur between them and the particles tending to diffuse out of the laser cavity along the path illustrated by the arrow 56. These collisions may tend to not only disorient the optically orientable particles in the secondary beam 30a but also may tend to drive back into the laser cavity 40 disoriented particles that originally were tending to diffuse out, Thus, a certain percentage of disoriented particles are generated in the entrance to the laser cavity 40. In order to prevent this disorientation applicant has provided the embodiment shown on FIGURE 6.

Figure 6:
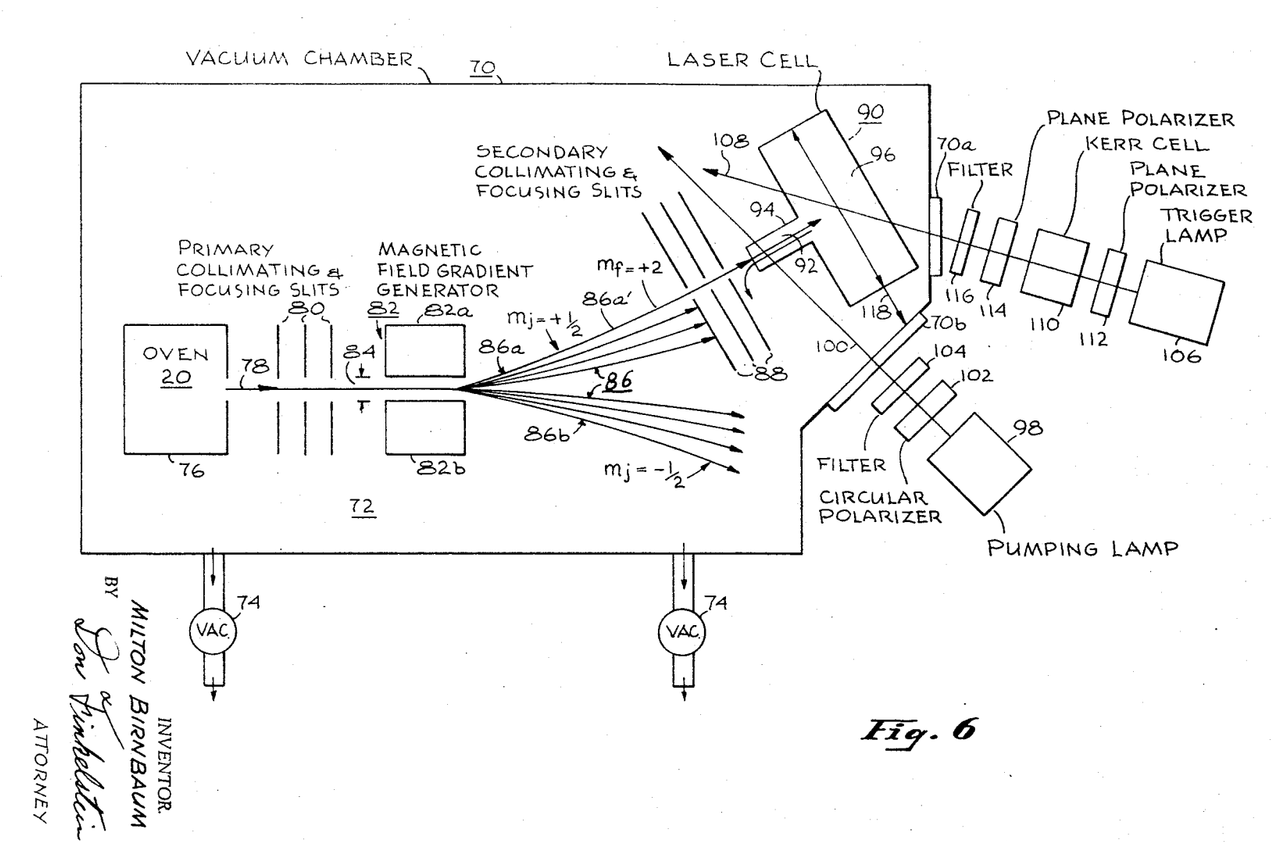
FIGURE 6 illustrates in schematic form another embodiment of applicant's invention.

As shown in FIGURE 6 there is a vacuum chamber 70 similar to the chamber 10 of FIGURE 2, having an interior 72 in which a preselected pressure is maintained by vacuum pumps 74 similar to the vacuum pumps 14 shown on FIGURE 2.

A source of optically orientable particles such as the oven 76 is contained within the chamber 70 and contains therein an optically orientable medium 20 which again, for descriptive purposes, may be sodium, and generates a beam of optically orientable particles 78 comprising sodium atoms in the ground energy state. The beam of optically orientable particles 78 is directed through primary collimating and focusing slits 80 similar to the primary collimating and focusing slits 21 of FIGURE 2, and then pass through a magnetic field gradient generator 22 having pole pieces 22a and 22b which may be similar to the magnetic field gradient generator 22 and the pole pieces 22a and 22b illustrated in FIGURES 2 and 3.

As the beam of optically orientable particles 78 which, in the embodiment illustrated on FIGURE 6 comprises sodium atoms, passes through the gap 84 between the pole pieces 82a and 82b of the magnetic field gradient generator 82, the unidirectional, nonuniform, strong magnetic field generated therein acts upon the beam of optically orientable particles 78 to both induce splitting therein into the secondary beams 86 and induces a physical separation therebetween. This results in the two secondary beams 86a and 86b, each comprised of the substantially homogeneous beams of optically orientable particles having a single magnetic substate. For purposes of illustration a single beam 86a' of the particular secondary beam 86a is selected for utilization in the embodiment illustrated on FIGURE 6 and this selected secondary beam 86a' is substantially homogeneous in the $m_f=+2$ magnetic substate of the F=2 level of the $S_{1/2}$ ground state of sodium. The other secondary beam 86b is evacuated from the interior 72 of chamber 70 through the vacuum pumps 74.

The selected secondary beam 86a' passes through secondary collimating and focusing slits 88 which may be similar to the secondary collimating and focusing slits 32 of the embodiment shown on FIGURE 2, and then enters a laser cell 90 through a passageway 92 in a tube-like member 94, and fills the cavity 96 of the laser cell 90. The laser cell 90 may be similar in construction to the laser cell 34 shown in the embodiment of applicant's invention of FIGURE 2 and FIGURE 4.

To prevent disorientation from the magnetic substate $m_f=+2$ of the selected secondary beam 86a' applicant provides an optical pumping lamp 98 adapted to generate a beam of optical pumping electromagnetic radiation 100. In the embodiment shown on FIGURE 6, the optical pumping lamp 98 may comprise a sodium vapor lamp and is positioned in regions external to the chamber 70, though if desired it may also be included within the chamber 70 in the interior 72 thereof.

The optical pumping electromagnetic radiation is provided to reorient the optically orientable particles into the $m_f=+2$ magnetic substate of the F=2 level of the $S_{1/2}$ ground state. To achieve this, the optical pumping light electromagnetic radiation 100 is circularly polarized by circular polarizer 102 and, if desired, may be filtered by filter 104 before irradiating the optically orientable particles.

As shown on FIGURE 6 the optical pumping electromagnetic radiation 100 irradiates the secondary beam 86a' in the passageway 92. This prevents collision disorientations within the passageway and adjacent the entrance thereof. However, the optical pumping electromagnetic radiation 100 may also be directed to irradiate the optically orientable particles after they are contained within the cavity 96 without interfering with the operation of applicant's laser. This optical pumping electromagnetic radiation 100 may be left on continually.

The optical pumping electromagnetic radiation 100 must contain energy in certain preselected wavelengths. For the sodium atoms utilized in FIGURE 6 as the optically orientable particles, this energy must be in wavelengths corresponding to the energy separations indicated by the lines 2 and 14 on FIGURE 1a, if it is determined that there are disoriented particles in both the F=2 and F=1 levels of the $S_{1/2}$ ground state. Either one or the other of these wavelengths may be omitted if particles are not in that particular level. Since the optical pumping light electromagnetic radiation 100 is circularly polarized, it induces energy transitions between the F=1 and F=2 levels of the $S_{1/2}$ ground energy state up to the $P_{1/2}$ first optically excited state and in these transitions there can only be a gain of one magnetic substate number. Thus, with the irradiation by the circularly polarized optical pumping light beam 100, all particles in either the F=1 or F=2 levels of the $S_{1/2}$ ground state are eventually pumped into the $mf=+2$ magnetic substate of the F=2 level of the $S_{1/2}$ ground state, which is the preselected energy level contained within the selected secondary beam 86a'. Thus, the number of particles disoriented from this magnetic substate $m_f=+2$ is reduced or eliminated entirely, thereby providing in the laser cavity 96 a substantially homogenous grouping of the optically orientable particles in the $m_f=+2$ magnetic substate of the F=2 level of the $S_{1/2}$ ground energy state.

A trigger lamp 106 which may be similar to the trigger lamp 58 of the embodiment illustrated on FIGURE 2 and which may comprise a sodium vapor lamp is adapted to emit an intense beam of trigger light electromagnetic radiation 108. To provide the cyclical irradiation of the optically orientable particles in the laser cavity 96 by the trigger light electromagnetic radiation 108, applicant provides in the embodiment illustrated on FIGURE 6 a Kerr cell 110. This Kerr cell may be similar to that disclosed in the Encyclopedic Dictionary of Physics, volume IV, page 160, which operates as an electronic shutter to cyclically transmit and terminate the trigger light electromagnetic radiation 108 to the laser cavity 96. Since the Kerr cell 110 requires plane polarized electromagnetic radiation for proper operation, the trigger light electromagnetic radiation first passes through a first plane polarizer 112 intermediate the trigger lamp 106 and the Kerr cell 110. A second plane polarizer 114 is provided intermediate the output of the Kerr cell 110 and the laser cell 90 to provide proper operation of the Kerr cell and a plane polarized trigger light electromagnetic radiation beam 108 is thus generated. Also, a filter 116 may be provided to eliminate undesired wavelengths in the trigger light electromagnetic radiation 108.

The trigger light electromagnetic radiation 108, as described in connection with the operation of applicant's invention illustrated in FIGURE 2, may contain energy in a wavelength corresponding to 5890 A. and/or 5896 A. Also, it is intense so that the optical pumping induced by the trigger light electromagnetic radiation occurs in a substantially short time.

As described above, the trigger light electromagnetic radiation 108 induces quantum energy transitions from the $m_f=+2$ magnetic substate of the F=2 level of the $S_{1/2}$ ground energy state up to the $P_{1/2}$ and $P_{3/2}$ optically excited states. This provides a population inversion between the $P_{1/2}$ and $P_{3/2}$ optically excited states and the empty F=1 level of the $S_{1/2}$ ground state and the particles commence a spontaneous decay therebetween. This ultimately results in the emission of a laser beam 118 containing energy in wavelengths equivalent to the energy separations indicated by the transitions shown on FIGURE 1c. Laser operation will cease when the population inversion is no longer sufficient to provide laser action in the laser cell 90.

If the optical pumping lamp 98 is directed to irradiate the optically orientable particles contained within the cavity 96, they will be immediately pumped back into the $m_f=+2$ magnetic substate by the pumping action of the optical pumping light beam 100 and thus the time required before the laser cavity 96 is once again filled with particles in the $m_f=+2$ magnetic substate is reduced and cyclic operation of the laser may be increased in frequency.

The walls defining the chamber 70 are transparent to preselected wavelengths of electromagnetic radiation in regions 70a and 70b that allow the transmission of the optical pumping light beam 100 and the trigger light electromagnetic radiation 108 into the interior 72 thereof, and allow the transmission of the laser beam 118 to regions external the chamber 70.

From the above description of the embodiments of applicant's invention illustrated in schematic form on FIGURES 2 and 6 it can be seen that only some of the optically orientable particles originally contained in the beam of optically orientable particles are utilized in the generation of the laser emission. Applicant has also found, according to the principles of his invention herein, that virtually all of the optically orientable particles may be utilized to provide the desired laser emission.

Figures 7, 8:
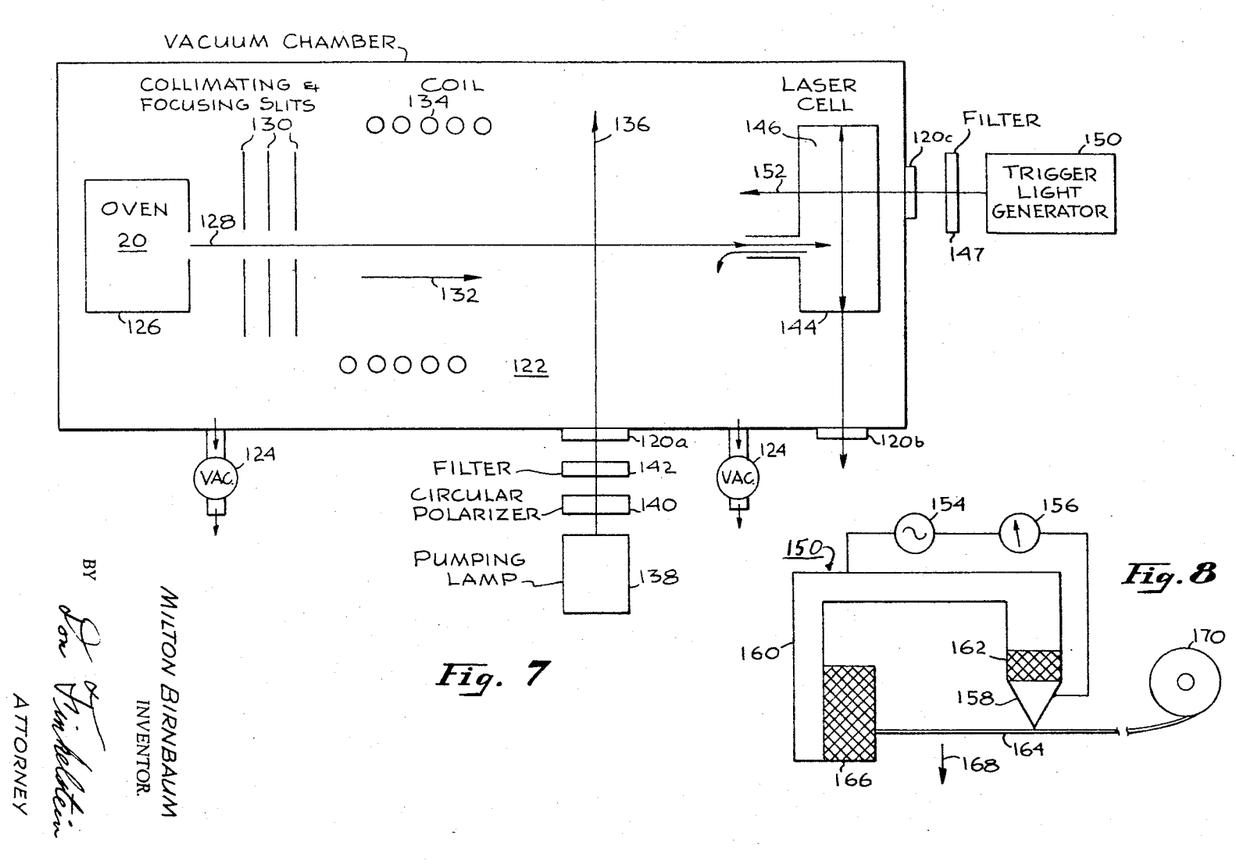
FIGURE 7 is a schematic representation of another embodiment of applicant's invention.
FIGURE 8 is a schematic representation of a trigger light generator useful in the practice of applicant's invention herein.

An embodiment of applicant's invention utilizing virtually all of the particles comprising a beam of optically orientable particles in the laser emission is illustrated in schematic form on FIGURE 7. The structure illustrated schematically on FIGURE 7 comprises a vacuum chamber 120 which may be similar to the chamber 10 of FIGURE 2 and the interior 122 of which is maintained at a preselected pressure by vacuum pumps 124 which may be similar to the vacuum pumps 14 of FIGURE 2. Contained within the interior portion 122 is a means for generating a beam of optically orientable particles such as the oven 126 which may be similar to the oven 18 illustrated on FIGURE 2.

Contained within the oven 126 is an optically orientable medium 20 which, for purposes of illustration, may be sodium. Thus, the oven 126 is adapted to emit a beam of optically orientable particles 128 comprising a plurality of sodium atoms in the ground energy state. The beam of optically orientable particles 128 passes through collimating and focusing slits 130 which may be similar to the primary collimating and focusing slits 21 illustrated on FIGURE 2. The beam of optically orientable particles 128 then passes through a unidirectional, uinform, weak magnetic field illustrated by the arrow 132 generated by coil means 134. The coil means may be powered by any desired source of electrical energy (not shown). The unidirectional, uniform, weak magnetic field 132 induces Zeeman splitting in the optically orientable particles into the magnetic substates of the F=1 and F=2 levels of the $S_{1/2}$ ground state.

After the beam of optically orientable particles 128 is split into the magnetic substates it is irradiated by optical pumping electromagnetic radiation 136 generated by an optical pumping lamp 138. The optical pumping lamp 138 may be similar to the optical pumping lamp 98 illustrated on FIGURE 6 and may, when sodium is utilized as the optically orientable medium 20, comprise a sodium vapor lamp. The optical pumping electromagnetic radiation 136 is circularly polarized by circular polarizer 140 and then may be filtered, if desired, by filter means 142 to eliminate undesired wavelengths contained within the optical pumping light beam 136.

As the optical pumping light beam 136 irradiates the beam of optically orientable particles 128, energy transitions therein are induced up to the $P_{1/2}$ first optically excited state and in these energy transitions the individual optically orientable particles undergo a gain of one magnetic substate number. Thus, as described above, virtually all the particles are ultimately pumped into the $m_f=+2$ magnetic substate of the F=2 level of the $S_{1/2}$ ground state after spontaneous decays from the $P_{1/2}$ first optically excited state by this optical pumping.

The optical pumping lamp 138 is preferably positioned close to a laser cell 144 which may be similar to the laser cells 34 illustrated on FIGURE 2 and 90 illustrated on FIGURE 6. This will insure that the particles entering a laser cavity 146 therein are all substantially in the $m_f=+2$ magnetic substate.

The optical pumping electromagnetic radiation 136 may either irradiate the beam of optically orientable particles 128 prior to its entrance into the laser cavity 146 of laser cell 144 or in addition thereto, irradiate the particles contained within the laser cavity 146. The optical pumping electromagnetic radiation 136 may continually irradiate both the beam 128 and/or the particles contained within the laser cavity 146 as this does not interfere with operation of applicant's invention.

A trigger light generator 150 is positioned to irradiate the particles contained within the laser cavity 146 with a cyclic beam of trigger light electromagnetic radiation 152. The trigger light electromagnetic radiation 152 is preferably intense to provide the above-described sudden transitions. In this embodiment of applicant's invention illustrated on FIGURE 7, the trigger light generator 150 may comprise an exploding wire arrangement as illustrated in schematic form on FIGURE 8.

As shown on FIGURE 8 a source of electrical energy 154 is connected through a rheostat 156 to a pair of electrodes 158 and 160 which are insulated from each other by a dielectric 162. A wire means 164 is cyclically positioned to contact electrode 158 and a breakdown dielectric 166 coupled to electrode 160. When the wire 164 is thus positioned, the voltage between the electrodes 158 and 160 may be progressively increased by operation of the rheostat 156 until the breakdown voltage of the breakdown dielectric 166 is reached at which time there will be a sudden continuous circuit between the electrode 158 and electrode 160 through wire means 164. This voltage is selected as one that is sufficient to explode the wire 164, as opposed to just melting it, in accordance with the known techniques of exploding wires.

The breakdown voltage of dielectric 162 is selected to be considerably greater than that of the breakdown dielectric 166. The exploding wire 164 emits essentially black body electromagnetic radiation, illustrated by the arrow 168 which comprises the trigger light electromagnetic radiation 146 of the embodiment illustrated on FIGURE 7. After each explosion of the exploding wire 164, new wire may be fed between the electrode 158 and the breakdown dielectric 166 from the reel means 170, to provide a cyclic irradiation of the optically orientable particles contained within the laser 142 by the trigger light beam electromagnetic radiation 146.

This cyclic irradiation induces the laser action within the laser cell 144 in a manner similar to that described above in connection with the embodiments of applicant's invention illustrated on FIGURES 2 and 6.

The trigger light electromagnetic radiation required in the operation of applicant's invention herein as illustrated by the embodiments shown in FIGURES 2, 6 and 7 is intense as described above. To achieve this high intensity and, since the operation of the trigger light electromagnetic radiation is only cyclic, applicant has found that black body electromagnetic radiation from a sufficiently high temperature source, such as the exploding bridge wire illustrated on FIGURE 8, can provide satisfactory trigger light electromagnetic radiation.

Even though there is a wide band of electromagnetic radiation wavelength contained within black body electromagnetic radiation from high temperature sources, the extraneous wavelengths may be filtered out by a filter means such as filter 147 shown on FIGURE 7, filter means 116 shown on FIGURE 6, or filter means 62 shown on FIGURE 2. However, if desired, these filters need not be provided as the extraneous wavelengths, in many applications, do not interfere with the normal operation of applicant's laser.

The black body temperature required to provide a sufficient intensity for operation of applicant's laser has been found by applicant to be on the order of 15,000° K., the exact value of course, depending upon the particular optical orientable material selected for utilization.

Thus, in addition to the trigger lights illustrated in FIGURES 2, 6 and 7, a plasma may also be utilized to provide the trigger light electromagnetic radiation as electromagnetic radiation emitted from a plasma is equivalent to black body electromagnetic radiation from a body at tens of thousands of degrees centigrade. The plasma is cyclically operable by nature and can provide the high intensity cyclic trigger light electromagnetic radiation desired for the operation of applicant's improved laser herein.

Similarly, applicant has found that a laser cell not incorporating reflective end plates may also be utilized in the practice of his invention. Such a structure, for example, comprises a laser cell in which the body member is sufficiently long so that stimulated emissions will occur from the amount of naturally occurring spontaneous energy decays in a direction parallel to the length of the laser cavity. It will be appreciated that the laser emission from applicant's optically orientable particles occurs during the time interval of irradiation by the trigger light electromagnetic radiation. That is, the laser pulse is completed before the termination of the trigger light electromagnetic radiation.

Therefore, it can be seen that applicant has an improved pulsed laser in which the structure and method of operation thereof permits the utilization of a variety of optically orientable materials to provide a source of laser emission. The wide variety of optically orientable materials that may be utilized with this improved structure and method of operation thus allows laser emission wavelengths in a pulsed coherent beam of electromagnetic radiation in a variety of wavelengths throughout the near and far ultraviolet, visible and infrared portions of the electromagnetic radiation spectrum. Further, applicant's invention herein permits the construction of a laser that is more economical to fabricate and operate than lasers previously known.

Those skilled in the art will find many adaptations and variations of applicant's invention. Therefore, the appended claims are intended to cover all such variations and adaptations falling within the true scope and spirit of this invention.

1. In a pulsed laser the improvement comprising in combination:
 means for generating a beam of optically orientable particles;
 magnetic field gradient generating means for subjecting said beam of optically orientable particles to a strong unidirectional magnetic field gradient to split said beam of optically orientable particles into a plurality of secondary beams and each of said plurality of secondary beams substantially homogeneous in optically orientable particles having energy in a preselected energy level;
 a laser cell having walls defining a cavity, a first portion of said walls comprising a passageway for communicating regions external said laser cell with said cavity and second portions of said walls transparent to preselected wavelengths of electromagnetic radiation and third portions of said walls comprising a pair of substantially flat, parallel and oppositely-disposed end members reflective of preselected wavelength of electromagnetic radiation in said cavity, and one of said end members partially transparent to said preselected wavelength of electromagnetic radiation, and said passageway registrably aligned with a first of said plurality of secondary beam of optically orientable particles having energy in a first preselected energy level;
 optical pumping light generating means for generating an optical pumping light beam of electromagnetic radiation;
 means for circularly polarizing said optical pumping light beam;
 said optical pumping light beam generating means positioned to irradiate said first preselected secondary beam of optically orientable particles adjacent the entrance to said passageway to induce energy transitions of particles into said first preselected energy level;
 means for maintaining said particles in said cavity at a preselected pressure;
 trigger light generating means for generating an intense beam of electromagnetic radiation;
 means for cyclically operating said trigger light generating means; and
 means for irradiating said particles in said cavity with said intense beam of electromagnetic radiation to induce energy transitions of said particles from said first preselected energy level to a second preselected energy level higher than said first preselected energy level whereby an overpopulation of said second preselected energy level with respect to a third energy level of said optically orientable medium is induced, and said particles undergo a spontaneous decay from said second preselected energy level to said third energy level and a stimulated emission of electromagnetic radiation is induced and a coherent beam of electromagnetic radiation is emitted through said partially transparent member.

2. In a pulsed laser the improvement comprising in combination:
 means for generating a beam of optically orientable particles;
 magnetic field generating means for subjecting said beam of optically orientable particles to a unidirectional magnetic field gradient to split said beam of optically orientable particles into a plurality of secondary beams and each of said plurality of secondary beams substantially homogeneous in optically orientable particles having energy in a preselected energy level;
 a laser cell having walls defining a cavity, a first portion of said walls comprising a passageway for communicating regions external said laser cell with said cavity and second portions of said walls transparent to preselected wavelengths of electromagnetic radiation and third portions of said walls comprising a pair of substantially parallel and oppositely-disposed members reflective of preselected wavelength of electromagnetic radiation in said cavity, and one of said members partially transparent to said preselected wavelength of electromagnetic radiation, and said passageway registrably aligned with a first preselected secondary beam of optically orientable particles having energy in a first preselected energy level;
 optical pumping light generating means for generating an optical pumping light beam of electromagnetic radiation;
 means for circularly polarizing said optical pumping light beam;
 said optical pumping light beam generating means positioned to irradiate said first preselected secondary beam of optically orientable particles adjacent the entrance to said passageway to induce energy transitions of particles into said first preselected energy level;
 unidirectional magnetic field generating means for subjecting said preselected secondary beam of optically orientable particles to a weak unidirectional magnetic field to induce Zeeman splitting therein;
 means for maintaining said particles in said cavity at a preselected pressure;
 trigger light generating means for generating an intense beam of electromagnetic radiation; and
 means for cyclically irradiating said particles in said cavity with said intense beam of electromagnetic radiation to induce energy transitions of said particles from said first preselected energy level to a second preselected energy level higher than said first preselected energy level whereby an overpopulation of said second preselected energy level with respect to other energy levels of said optically orientable medium is induced, and said particles undergo a spontaneous decay from said second preselected energy level to said other energy levels and a stimulated emission of electromagnetic radiation is induced during said transition to said other energy levels and a coherent beam of electromagnetic radiation is emitted through said partially transparent member.

3. A pulsed laser comprising in combination:
 means for generating a beam of optically orientable particles having energy in a first preselected quantum energy level;
 a laser cell having walls defining a cavity, a first portion of said walls comprising a passageway for communicating regions external said laser cell with said cavity, and second portions of said walls transparent to preselected wavelengths of electromagnetic radiation, and third portions of said walls comprising a pair of flat parallel oppositely-disposed wall members in a preselected spaced relationship, said wall members having surfaces reflective of a preselected wavelength of electromagnetic radiation for reflecting said preselected wavelength of electromagnetic radiation therebetween across said cavity, and one of said members partially transparent to said preselected wavelength of electromagnetic radiation, and said passageway registrably aligned with said beam of optically orientable particles for receiving said beam of optically orientable particles and transmitting said particles into said cavity;

means for maintaining said particles in said cavity at a preselected pressure;

trigger light generating means for generating an intense beam of trigger light electromagnetic radiation having energy in a wavelength corresponding to the energy separation between said first preselected energy level of said particles and a second preselected quantum energy level of said particles higher than said first preselected quantum energy level;

means for cyclically operating said trigger light generating means; and means for irradiating said particles with said trigger light beam of electromagnetic radiation to induce energy transitions of said particles from said first preselected energy level to said second preselected energy level whereby a population inversion of said particles is induced between said second preselected energy level and a third preselected energy level lower than said second preselected energy level and said particles undergo a stimulated energy transition from said second preselected energy level to said third preselected energy level and a coherent beam of electromagnetic radiation is emitted from said particles through said partially transparent member.

4. A pulsed laser comprising in combination:

means for generating a beam of optically orientable particles having energy in a first preselected quantum energy level;

a laser cell having walls defining a cavity, a first portion of said walls comprising a passageway for communicating regions external said laser cell with said cavity, and second portions of said walls transparent to preselected wavelengths of electromagnetic radiation, and third portions of said walls comprising a pair of flat parallel oppositely-disposed wall members in a preselected spaced relationship, said wall members having surfaces reflective of a preselected wavelength of electromagnetic radiation for reflecting said preselected wavelength of electromagnetic radiation therebetween across said cavity, and one of said members partially transparent to said preselected wavelength of electromagnetic radiation, and said passageway registrably aligned with said beam of optically orientable particles for receiving said beam of optically orientable particles and transmitting said particles into said cavity;

means for maintaining said particles in said cavity at a preselected pressure;

trigger light generating means for generating an intense beam of trigger light electromagnetic radiation having energy in a wavelength corresponding to the energy separation between said first preselected energy level of said particles and a second preselected quantum energy level of said particles higher than said first preselected quantum enregy level;

a first plane polarizer means intermediate said trigger lamp and said laser cell for plane polarizing said trigger light beam of electromagnetic radiation;

a Kerr cell adapted to receive said plane polarized trigger light beam and cyclically transmit said trigger light beam to said particles; and a second plane polarizer means intermediate said Kerr cell and said laser cell for plane polarizing said trigger light beam emitted from said Kerr cell to induce energy transitions of said particles from said first preselected energy level to a second preselected energy level lighter than said first preselected energy level whereby a population inversion of said particles is induced between said second preselected energy level and a third preselected energy level lower than said first preselected energy level, and said particles undergo a stimulated energy transition from said preselected energy level to said third preselected energy level and a coherent beam of electromagnetic radiation is emitted from said laser cell through said partially transparent member.

5. The arrangement defined in claim 4 wherein said optically orientable particles comprise an istope selected from the group consisting of helium, mercury, cesium, sodium, potassium, rubidium, calcium, cadmium and magnesium.

6. The arrangement defined in claim 3 wherein said trigger light generating means comprises an exploding wire arrangement.

7. The arrangement defined in claim 3 wherein said trigger light generating means comprises a plasma.

References Cited

UNITED STATES PATENTS

| | | | |
|---|---|---|---|
| 2,851,652 | 9/1958 | Dicke | 331—94.5 X |
| 3,102,920 | 9/1963 | Sirons | 331—94.5 |
| 3,211,055 | 10/1965 | Andres | 331—94.5 X |
| 3,163,799 | 12/1964 | Buchman | 331—94.5 |
| 3,172,056 | 3/1965 | Stitck | 331—94.5 |
| 3,175,088 | 3/1965 | Herriott | 250—199 |
| 3,178,657 | 4/1965 | Morse | 331—94.5 |
| 3,242,440 | 3/1966 | Kaester | 331—94.5 |

FOREIGN PATENTS

| | | |
|---|---|---|
| 608,711 | 3/1962 | Belgium. |

OTHER REFERENCES

Electronics: "Kerr Shutter Control 50 Mm.. Pulsed Laser," vol. 35, No. 25, p. 7, June 22, 1962, TK 7800 E58.

Rabinowitz et al.: "Continuous Optically Pumped Cs Laser," applied optics, vol. 1, No. 4, pp. 513–516, July 1962, Qc 350 A5.

Stevenson et al.: "Exploding Wires as Pumping Sources for Optical Maser," Bull. Amer. Phys. Soc., vol. 7, No. 3, p. 195, Mar 26, 1962, QC1A58.

Boyd et al.: "Confocal Multinode Resonator for Millimeter Through Optical Wavelength Maser," Bell System Technical Journal vol. 40, No. 2, March 1961, pp. 489–490.

JEWELL H. PEDERSEN, Primary Examiner

E. BAUER, Assistant Examiner